(12) United States Patent
Kim et al.

(10) Patent No.: US 9,997,758 B2
(45) Date of Patent: Jun. 12, 2018

(54) BATTERY MODULE HAVING BUS BAR ASSEMBLY AND BATTERY PACK COMPRISING THE SAME

(71) Applicant: LG CHEM, LTD., Seoul (KR)

(72) Inventors: Juhan Kim, Daejeon (KR); Jin-Kyu Shin, Daejeon (KR); Bum Hyun Lee, Daejeon (KR); Taeyeop Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 240 days.

(21) Appl. No.: 14/421,582

(22) PCT Filed: Oct. 24, 2013

(86) PCT No.: PCT/KR2013/009513
§ 371 (c)(1),
(2) Date: Feb. 13, 2015

(87) PCT Pub. No.: WO2014/073808
PCT Pub. Date: May 15, 2014

(65) Prior Publication Data
US 2015/0236326 A1  Aug. 20, 2015

(30) Foreign Application Priority Data

Nov. 12, 2012  (KR) ........................ 10-2012-0127154

(51) Int. Cl.
*H01M 2/20* (2006.01)
*H01M 2/34* (2006.01)
*H01M 2/30* (2006.01)

(52) U.S. Cl.
CPC ............. *H01M 2/206* (2013.01); *H01M 2/30* (2013.01); *H01M 2/34* (2013.01); *H01M 2220/20* (2013.01)

(58) Field of Classification Search
None
See application file for complete search history.

(56) References Cited

U.S. PATENT DOCUMENTS 7,951,477 B2   5/2011  Wood et al.
2006/0177734 A1   8/2006  Yao
(Continued)

FOREIGN PATENT DOCUMENTS

CN   101627490 A   1/2010
CN   102263222 A   11/2011
(Continued)

OTHER PUBLICATIONS

KIPO English Language Machine Translation of KR10-2011-0060480.*
International Search Report, issued in PCT/KR2013/009513, dated Feb. 14, 2014.

*Primary Examiner* — Jayne L Mershon
(74) *Attorney, Agent, or Firm* — Birch, Stewart, Kolasch & Birch, LLP

(57) ABSTRACT

Disclosed herein is a battery module including a unit module assembly including unit modules, each of which includes a plurality of battery cells or a plurality of cell assemblies, each of which includes two or more battery cells, as unit cells, the unit modules being arranged while being adjacent to each other, each of the unit modules having electrode terminals arranged at one side thereof, a battery disconnect unit (BDU) arranged at one side of the unit module assembly, the battery disconnect unit having terminal connection parts arranged at the same side as the electrode terminals, a module case in which the unit modules of the unit module assembly are mounted, the electrode terminals of the unit modules being exposed through the module case, and a bus bar assembly including a cover plate mounted on the electrode terminals of the unit modules at the module case, the (Continued)

cover plate being formed of an insulative material, and two more bus bars mounted to the cover plate.

20 Claims, 10 Drawing Sheets

(56) References Cited

U.S. PATENT DOCUMENTS

| | | |
|---|---|---|
| 2006/0214631 A1 | 9/2006 | Yoon et al. |
| 2009/0214936 A1 | 8/2009 | Yang et al. |
| 2009/0274952 A1* | 11/2009 | Wood .................. B60L 11/1874 429/99 |
| 2010/0047682 A1 | 2/2010 | Houchin-Miller et al. |
| 2010/0216015 A1* | 8/2010 | Kamada .................. H01M 2/30 429/178 |
| 2011/0104555 A1 | 5/2011 | Han et al. |
| 2011/0111649 A1 | 5/2011 | Garascia et al. |
| 2011/0159350 A1* | 6/2011 | Ochi .................. H01M 2/1077 429/159 |
| 2011/0293992 A1* | 12/2011 | Hsu .................. H01M 2/206 429/152 |
| 2012/0231324 A1* | 9/2012 | Brisbane .................. H01M 2/043 429/152 |
| 2013/0189563 A1 | 7/2013 | Chang et al. |
| 2013/0236751 A1 | 9/2013 | Seong et al. |

FOREIGN PATENT DOCUMENTS

| | | | | |
|---|---|---|---|---|
| CN | 102683621 A | | 9/2012 | |
| JP | 2004-362997 A | | 12/2004 | |
| JP | 2011-165477 A | | 8/2011 | |
| JP | 2012-182082 A | | 9/2012 | |
| KR | 10-2011-0060480 | * | 6/2011 | .............. H01M 2/14 |
| KR | 10-2011-0060480 A | | 6/2011 | |
| KR | 10-2012-0055451 A | | 5/2012 | |
| KR | 10-2012-0074421 A | | 7/2012 | |
| TW | 200629628 | | 8/2006 | |
| TW | I289368 B | | 11/2007 | |
| TW | 200814406 A | | 3/2008 | |
| TW | I308406 B | | 4/2009 | |
| TW | I337414 B | | 2/2011 | |
| WO | WO 2011/126216 A2 | | 10/2011 | |
| WO | WO 2012/070782 A2 | | 5/2012 | |

* cited by examiner

[FIG. 1]
10
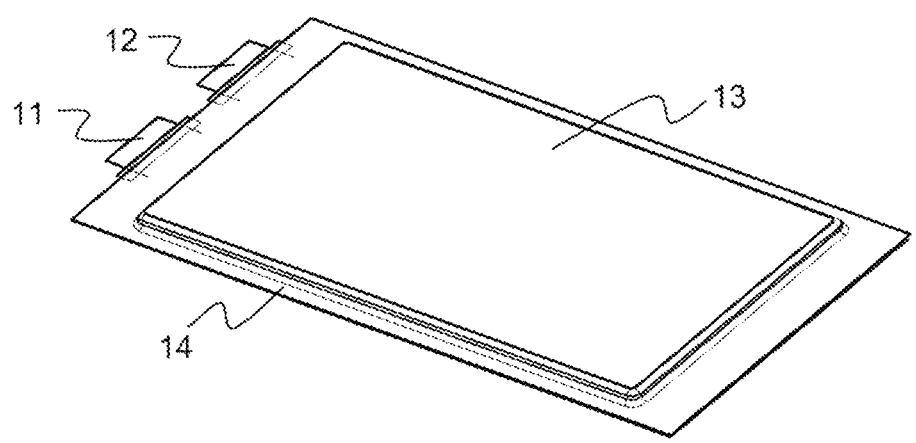
[FIG. 2]
110
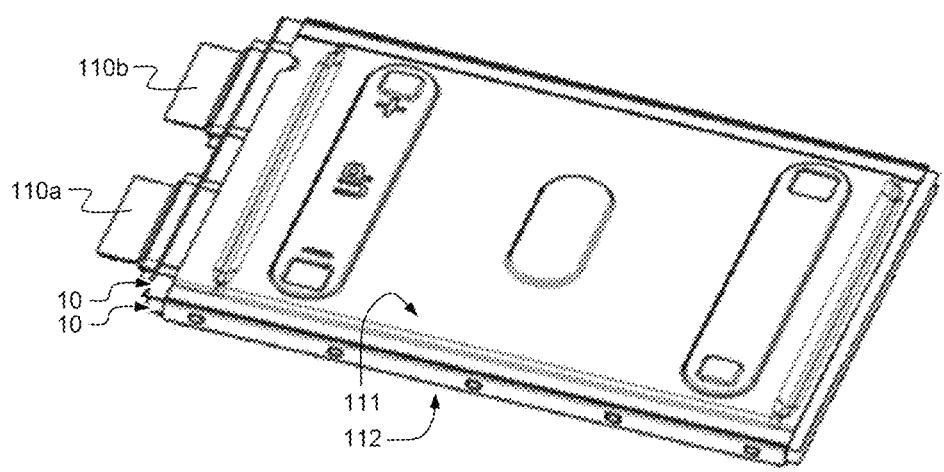

[FIG. 3]
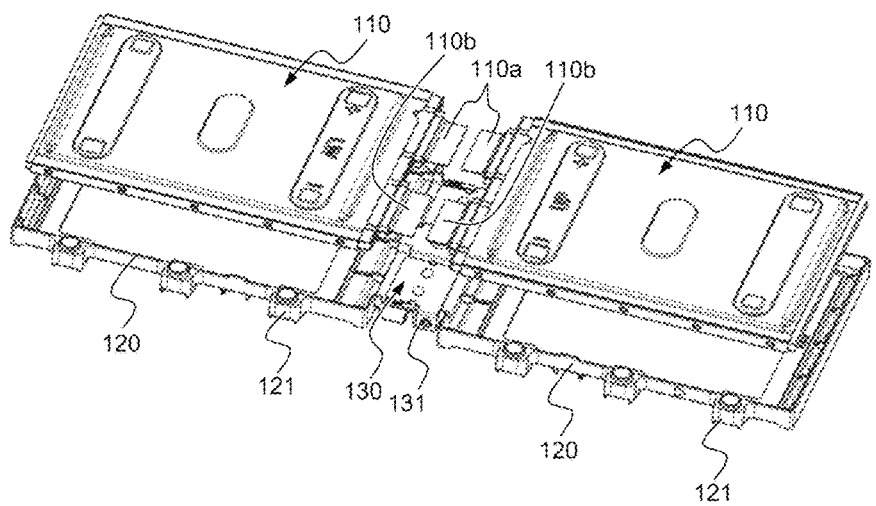
[FIG. 4]
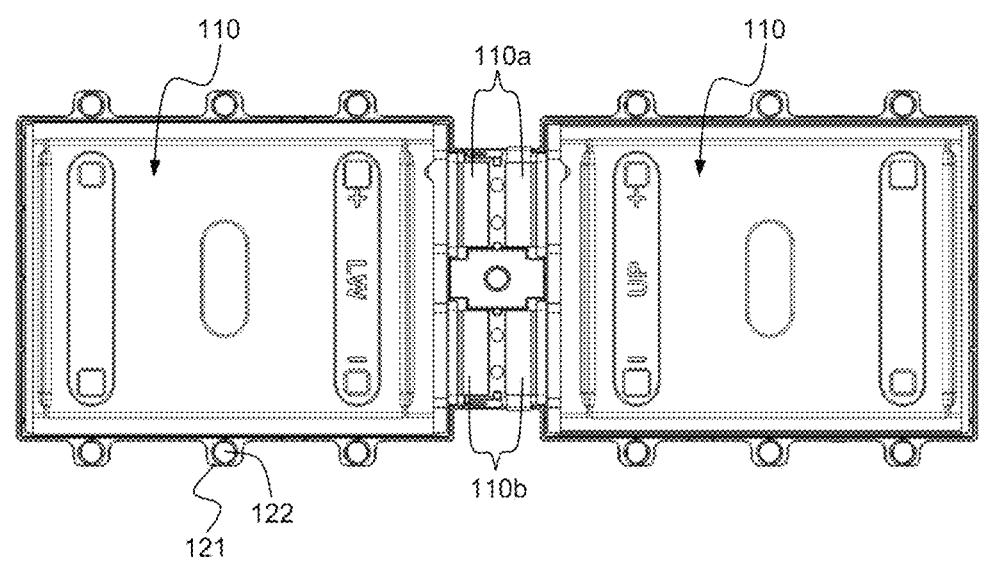

[FIG. 5]
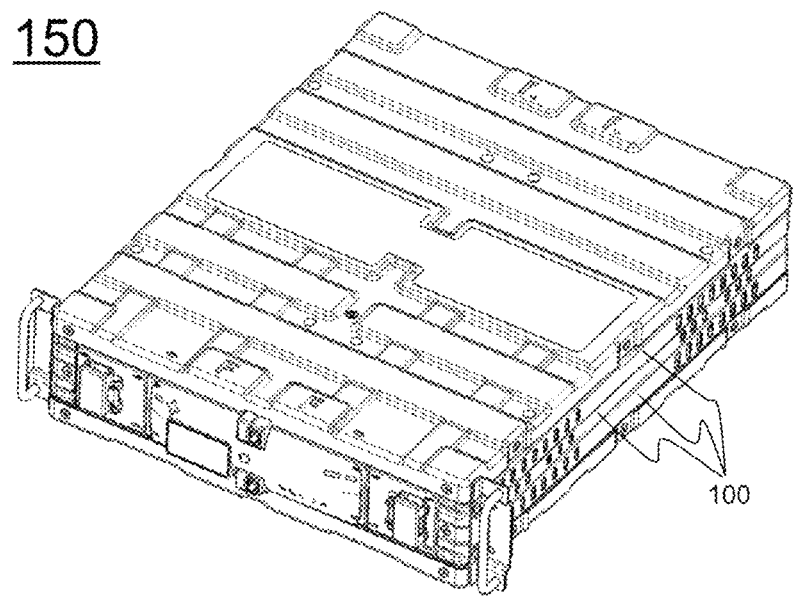
[FIG. 6]
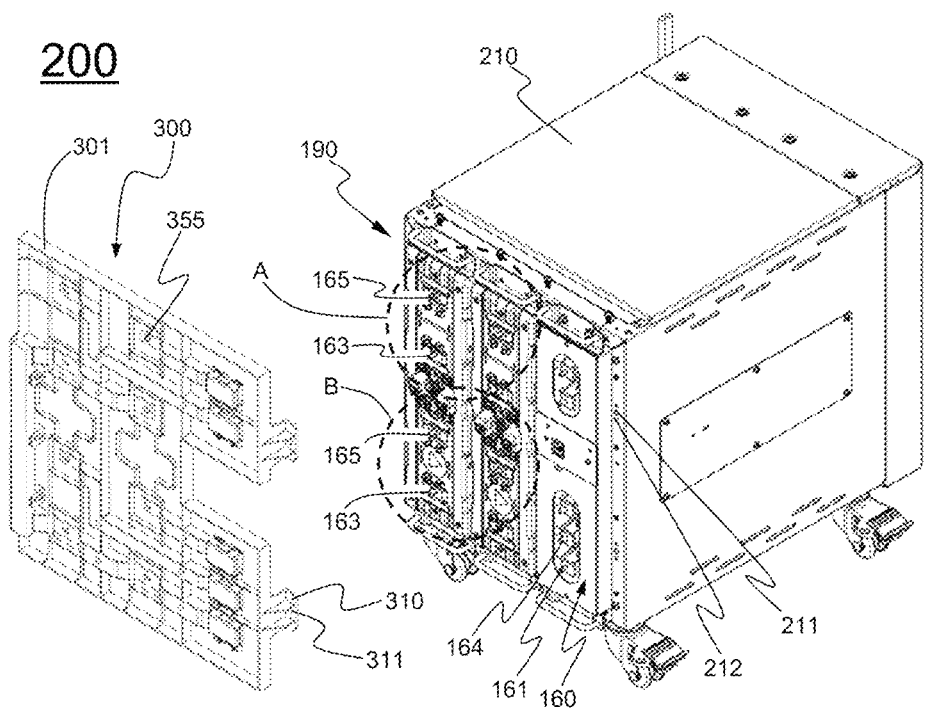

[FIG. 7]
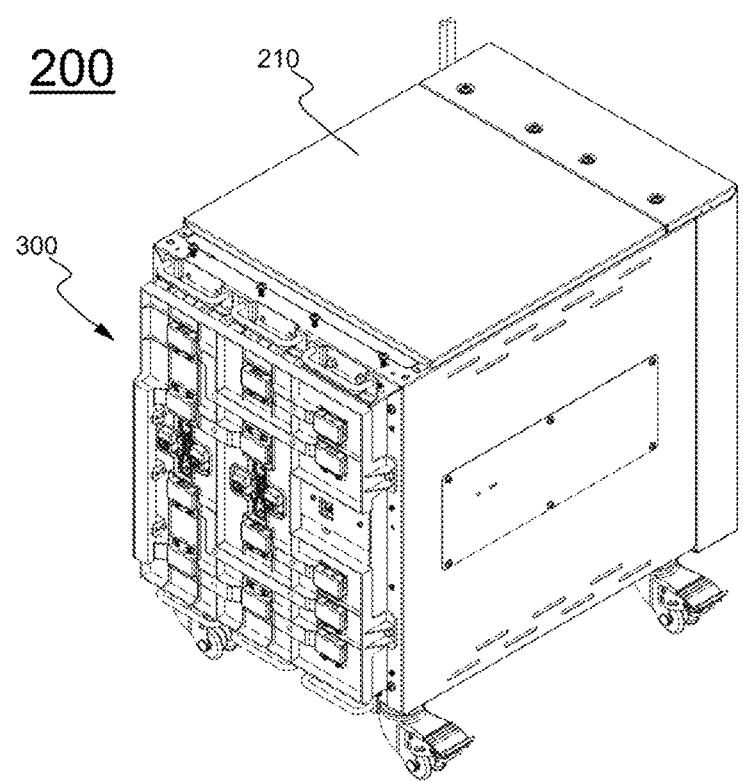

[FIG. 8]
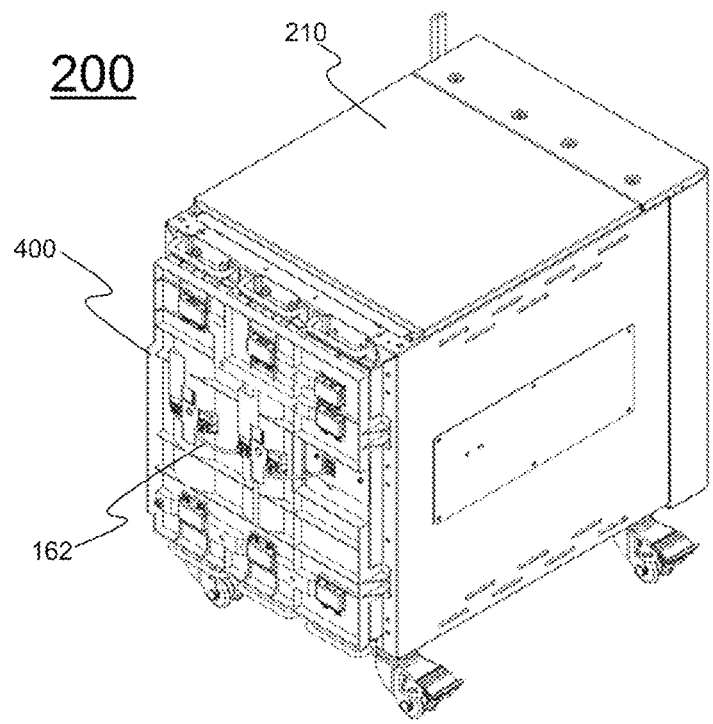

[FIG. 9]
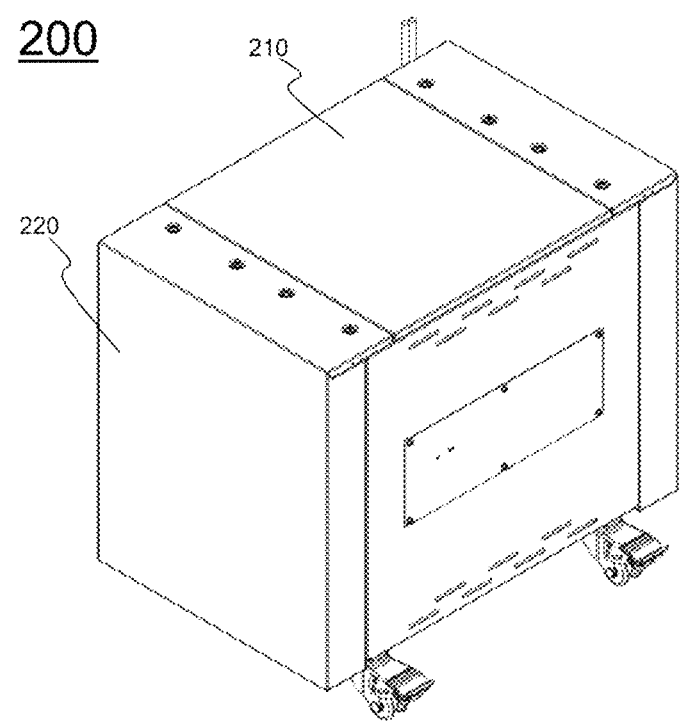

[FIG. 10]
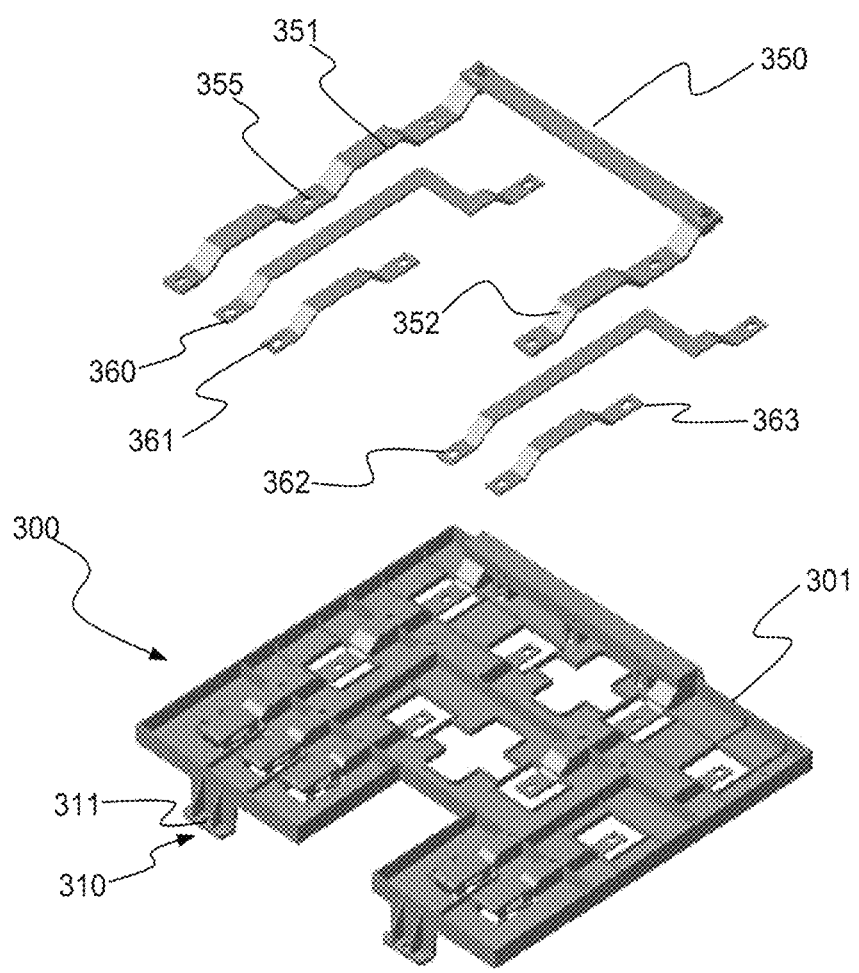

[FIG. 11]
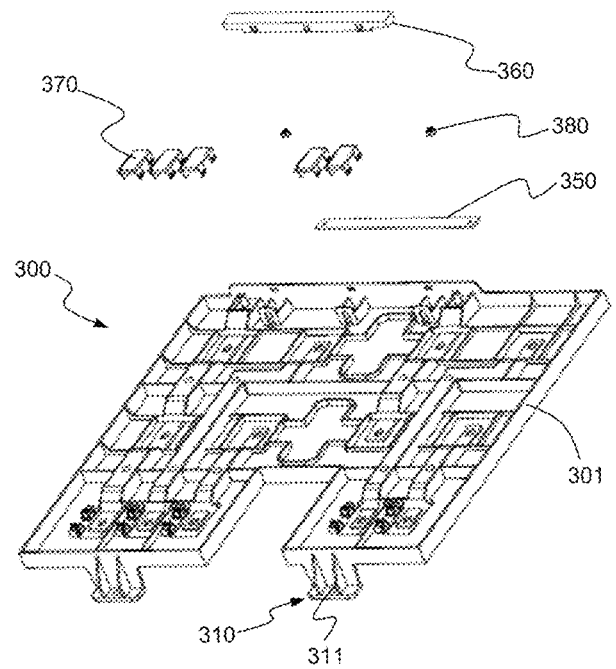
[FIG. 12]
300
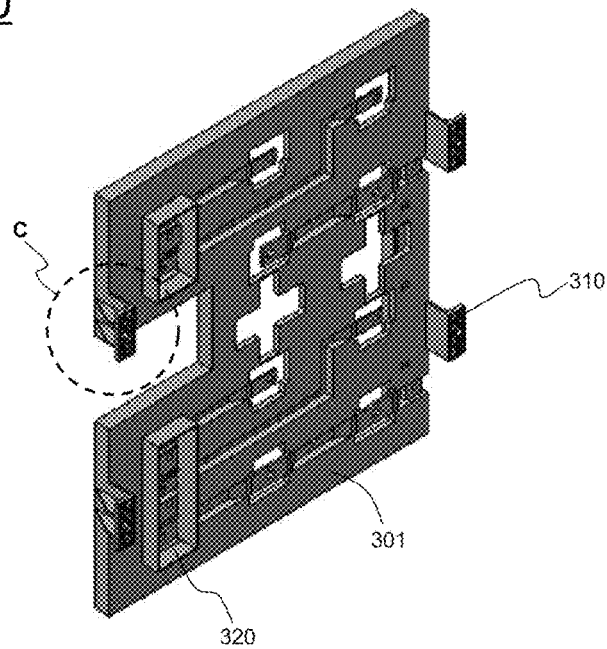

【FIG. 13】
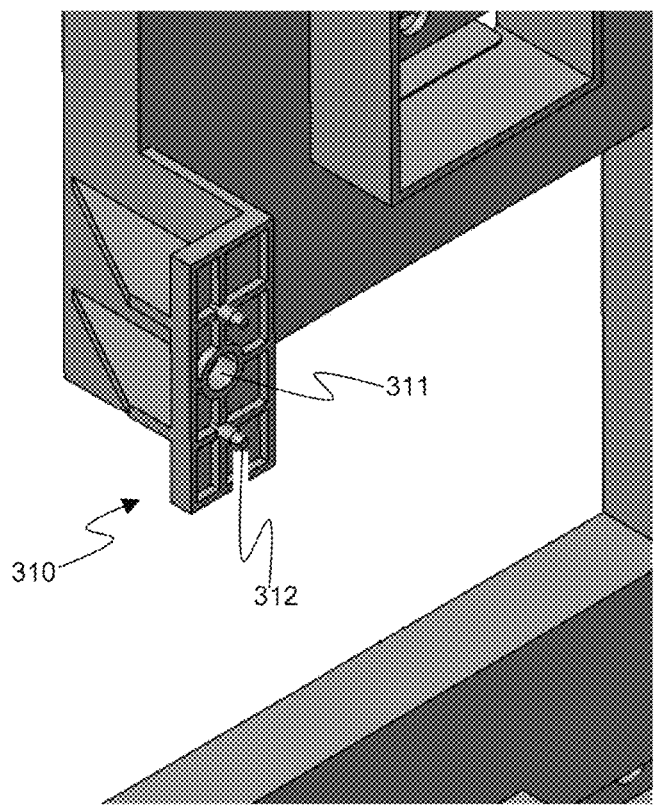
【FIG. 14】
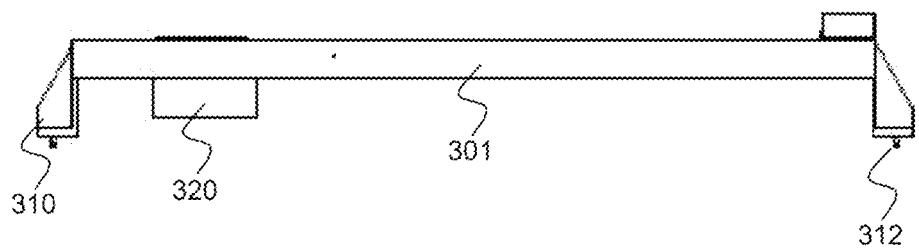

[FIG. 15]
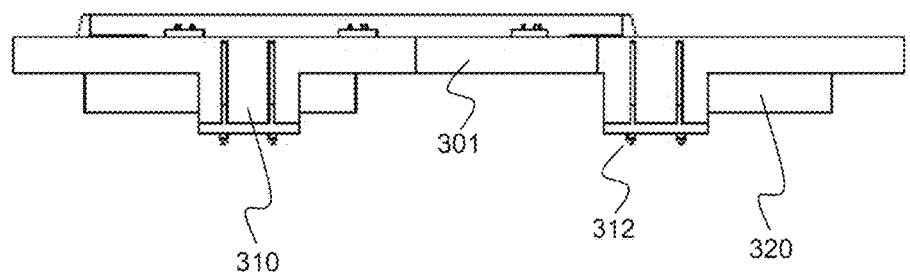

BATTERY MODULE HAVING BUS BAR ASSEMBLY AND BATTERY PACK COMPRISING THE SAME

TECHNICAL FIELD

The present invention relates to a battery module having a bus bar assembly and a battery pack including the same and, more particularly, to a battery module including a unit module assembly including unit modules, each of which includes a plurality of battery cells or a plurality of cell assemblies, each of which includes two or more battery cells, as unit cells, the unit modules being arranged while being adjacent to each other, each of the unit modules having electrode terminals arranged at one side thereof, a battery disconnect unit arranged at one side of the unit module assembly, the battery disconnect unit having terminal connection parts arranged at the same side as the electrode terminals, a module case in which the unit modules of the unit module assembly are mounted, the electrode terminals of the unit modules being exposed through the module case, and a bus bar assembly including a cover plate mounted on the electrode terminals of the unit modules at the module case, the cover plate being formed of an insulative material, and two more bus bars mounted to the cover plate.

BACKGROUND ART

A secondary battery, which can be charged and discharged, has been widely used as an energy source for wireless mobile devices. In addition, the secondary battery has attracted considerable attention as a power source for electric vehicles (EV) and hybrid electric vehicles (HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery module having a plurality of battery cells electrically connected to each other because high output and large capacity are necessary for the middle or large-sized devices.

Preferably, a middle or large-sized battery module is manufactured so as to have as small a size and weight as possible. For this reason, a prismatic battery or a pouch-shaped battery, which can be stacked with high integration and has a small weight to capacity ratio, is usually used as a battery cell of the middle or large-sized battery module. In particular, much interest is currently focused on the pouch-shaped battery, which uses an aluminum laminate sheet as a sheathing member, because the pouch-shaped battery is lightweight and the manufacturing cost of the pouch-shaped battery is low.

Meanwhile, for the battery module to provide output and capacity required by a predetermined apparatus or device, it is necessary for the battery module to be configured to have a structure in which a plurality of battery cells are electrically connected to each other in series or in parallel. In addition, it is necessary for the battery module to be configured to have a structure which is easily extendable and stable as the capacity of the battery module is increased. Particularly, in a case in which a plurality of battery cells is used to constitute the battery module or a plurality of cell modules, each of which includes a predetermined number of battery cells, is used to constitute the battery module, a plurality of members, such as bus bars, for mechanical fastening and electrical connection between the battery cells or the cell modules is generally needed and, as a result, a process of assembling such members is very complicated.

For example, conventionally, a power cable or bus bars are used to directly achieve electrical connection of the battery module. In this case, however, a short circuit due to a tool may occur during electrical connection of the battery module. On the other hand, the battery module may be misassembled.

Particularly, for the power cable, great force is needed depending upon the specification of electric current supplied to the power cable. In order to solve this problem, methods of easily achieving electrical connection using an additional connector or a plug-in connector have been proposed. Even in these methods, however, additional members are needed with the result that the number of unnecessary parts is increased.

There is needed a space for coupling, welding, or soldering the mechanical fastening and electrical connection members with the result that the total size of a battery system is increased. The increase in size of the battery system is not preferable in an aspect of the spatial limit of an apparatus or device in which the battery module is mounted.

Therefore, there is a high necessity for a middle or large-sized battery pack that can be easily assembled with fundamentally secured safety while solving the above problems.

DISCLOSURE

Technical Problem

Therefore, the present invention has been made to solve the above problems and other technical problems that have yet to be resolved.

Specifically, it is an object of the present invention to provide a bus bar assembly that is capable of electrically connecting a plurality of cell module assemblies without using a plurality of members for mechanical fastening and electrical connection between the cell module assemblies while being configured to have a specific structure that can be easily extended.

It is another object of the present invention to a battery module assembly having a compact and highly stable structure including a bus bar assembly and a battery module configured based thereupon.

Technical Solution

In accordance with one aspect of the present invention, the above and other objects can be accomplished by the provision of a battery module including a unit module assembly including unit modules, each of which includes a plurality of battery cells or a plurality of cell assemblies, each of which includes two or more battery cells, as unit cells, the unit modules being arranged while being adjacent to each other, each of the unit modules having electrode terminals arranged at one side thereof, a battery disconnect unit (BDU) arranged at one side of the unit module assembly, the battery disconnect unit having terminal connection parts arranged at the same side as the electrode terminals, a module case in which the unit modules of the unit module assembly are mounted, the electrode terminals of the unit modules being exposed through the module case, and a bus bar assembly including a cover plate mounted on the electrode terminals of the unit modules at the module case, the cover plate being formed of an insulative material, and two more bus bars mounted to the cover plate.

As described above, the battery module according to the present invention is generally compact and exhibits excellent structural stability. In addition, the battery cells are connected to each other in parallel using the bus bar assembly having a specific structure in which the bus bars are integrally formed at the cover plate, which is an insulator. Consequently, it is possible to easily assemble the battery module. In addition, it is possible to fundamentally prevent misassembly of the battery module or a short circuit in the battery module during manufacture of the battery module.

In a concrete example, each of the battery cells may be a plate-shaped battery cell, which is configured to have a structure in which an electrode assembly is mounted in a laminate battery case.

Each of the cell assemblies may be configured to have a structure in which two or more plate-shaped battery cells are mounted to the cell cover in a state in which the electrode terminals are exposed. The cell cover may be a pair of sheathing members coupled to each other for covering outsides of the battery cells excluding the electrode terminals of the battery cells.

Each of the unit modules may be configured such that the unit cells include a parallel connection and a series connection. For example, each of the unit modules may have two or more cathode terminals and two or more anode terminals.

In the above structure, each of the unit modules may include a first arrangement in which one cathode terminal and one anode terminal are formed and a second arrangement in which one cathode terminal and one anode terminal are formed, the second arrangement being located adjacent to the first arrangement.

In a preferred example, the bus bars may connect the unit modules to the BDU in parallel.

In a concrete example, the bus bars may include one anode bus bar for connecting anode terminals of the unit modules to an anode terminal connection part of the BDU and two or more cathode bus bars for connecting cathode terminals of the unit modules to cathode terminal connection parts of the BDU, respectively.

In addition, the bus bars may be coupled to the cover plate in a state in which terminal connection portions of the bus bars protrude.

In a concrete example, fastening holes may be formed at the terminal connection portions of the bus bars and the electrode terminals of the unit modules and fastening members may be inserted into the fastening holes for connection. The fastening members may be bolts. However, embodiments of the present invention are not limited thereto.

According to circumstances, fastening holes may be formed at the terminal connection portions of the bus bars and fastening protrusions may be formed at the electrode terminals of the unit modules, the fastening protrusions being inserted into the fastening holes.

In a concrete example, the cover plate and the bus bars of the bus bar assembly may be integrally formed by insert injection molding.

According to circumstances, the bus bar assembly may be configured to have a structure in which the bus bars are coupled to the cover plate by fastening.

In addition, two or more terminal covers for covering the terminals may be further mounted at the bus bar assembly. For example, the terminal covers may be coupled to the bus bar assembly by hook fastening. However, embodiments of the present invention are not limited thereto.

Two or more insulation members for securing electrical insulation may be further mounted at the bus bar assembly.

The cover plate may be provided with ribs protruding toward the unit modules for preventing interference between the electrode terminals. During manufacture of the battery module, therefore, it is possible to prevent contact between the electrode terminals through the above structure.

The cover plate may be provided with two or more fastening ribs, which are fastened to the module case, the fastening ribs protruding toward the module case.

In a concrete example, fastening through holes may be formed at the fastening ribs and the module case. One or more positioning protrusions may be formed at each of the fastening ribs and one or more insertion holes may be formed at a corresponding portion of the module case. Consequently, the cover plate can be stably mounted to the module case.

In accordance with another aspect of the present invention, there is provided a battery pack including two or more of the battery modules with the above-stated construction mounted in a pack case.

In accordance with a further aspect of the present invention, there is provided a device including the battery module or the battery pack as a power source.

A preferred example of the device in which the battery pack according to the present invention may be used may include an electric vehicle, a hybrid electric vehicle, a plug-in hybrid electric vehicle, or a power storage device, which has a limited installation space and is exposed to frequent vibration and strong impact.

Of course, the battery pack used as the power source of the vehicle may be combined and manufactured based on desired output and capacity.

The electric vehicle, the hybrid electric vehicle, the plug-in hybrid electric vehicle, and the power storage device are well known in the art to which the present invention pertains and, therefore, a detailed description thereof will be omitted.

Effects of the Invention

As is apparent from the above description, a battery module according to the present invention is generally compact and exhibits excellent structural stability. In addition, battery cells are connected to each other in parallel using a bus bar assembly having a specific structure in which bus bars are integrally formed at a cover plate, which is an insulator. Consequently, it is possible to easily assemble the battery module. In addition, it is possible to prevent misassembly of the battery module or a short circuit in the battery module during manufacture of the battery module.

BRIEF DESCRIPTION OF DRAWINGS

The above and other objects, features and other advantages of the present invention will be more clearly understood from the following detailed description taken in conjunction with the accompanying drawings, in which:

FIG. 1 is a perspective view showing a pouch-shaped battery cell according to the present invention;

FIG. 2 is a perspective view showing a unit cell (cell assembly) configured to have a structure in which battery cells, one of which is shown in FIG. 1, are mounted in a cell cover;

FIG. 3 is a perspective view showing that unit cells, one of which is shown in FIG. 2, are mounted in a cartridge to constitute a unit stack;

FIG. 4 is a plan view showing a unit stack according to the present invention;

FIG. 5 is a perspective view showing a unit module according to the present invention;

FIGS. 6 to 9 are perspective views showing a process of assembling a battery module according to an embodiment of the present invention;

FIGS. 10 and 11 are exploded perspective views showing a bus bar assembly according to an embodiment of the present invention;

FIG. 12 is a bottom perspective view of the bus bar assembly according to the present invention;

FIG. 13 is a partially enlarged view showing a part C of FIG. 12; and

FIGS. 14 and 15 are side views of the bus bar assembly according to the present invention.

DETAILED DESCRIPTION OF THE INVENTION

Now, preferred embodiments of the present invention will be described in detail with reference to the accompanying drawings. It should be noted, however, that the scope of the present invention is not limited by the illustrated embodiments.

FIG. 1 is a perspective view showing a pouch-shaped battery cell according to the present invention.

Referring to FIG. 1, there is shown a plate-shaped battery cell 10 having electrode terminals (a cathode terminal 11 and an anode terminal 12) formed at one end thereof. Specifically, the plate-shaped battery cell 10 is configured to have a structure in which an electrode assembly (not shown) is mounted in a pouch-shaped case 13 formed of a laminate sheet including a metal layer (not shown) and a resin layer (not shown) and a sealed portion 14 is formed by thermal welding. The plate-shaped battery cell 10 may be commonly called a 'pouch-shaped battery cell.'

FIG. 2 is a perspective view showing a unit cell (cell assembly) configured to have a structure in which battery cells, one of which is shown in FIG. 1, are mounted in a cell cover.

Referring to FIG. 2 together with FIG. 1, two battery cells 10 are received and fixed in a cell cover 111 and 112 including an upper cell cover 111 and a lower cell cover 112. In addition, electrode terminals 11 and 12 of the two battery cells 10 are connected to each other in parallel to constitute two electrode terminals 110a and 110b, which are exposed from the cell cover in one direction.

FIG. 3 is a perspective view showing that unit cells, one of which is shown in FIG. 2, are mounted in a cartridge to constitute a unit stack, FIG. 4 is a plan view showing a unit stack according to the present invention, and FIG. 5 is a perspective view showing a unit module according to the present invention.

Referring to these drawings, two unit cells 110 are mounted in a cartridge 120 to constitute a unit stack 100. A plurality of unit stacks 100 is stacked while being adjacent to each other to constitute a unit module 150. The two unit cells 110 are arranged such that cathode terminals 110a and anode terminals 110b of the unit cells 110 face each other. In addition, the electrode terminals 110a and 110b are electrically connected to each other in parallel via a bus bar 130.

In addition, the cartridge 120 is provided at opposite sides thereof with protrusions 121, each of which has a fastening hole 122. The unit stacks 100 are coupled to each other by fastening members (not shown) extending through the respective fastening holes 122.

FIGS. 6 to 9 are perspective views typically showing a process of assembling a battery module according to an embodiment of the present invention and FIGS. 10 and 11 are exploded perspective views typically showing a bus bar assembly according to an embodiment of the present invention.

Referring to these drawings together with FIGS. 1 to 5, a battery module 200 includes unit modules 150 vertically arranged while being adjacent to each other, a battery disconnect unit 160 mounted over one sides of the unit modules 150, a module case 210 in which the unit modules 150 are mounted, a bus bar assembly 300 mounted at the front of the module case 210, and a bus bar assembly cover 400 and a front cover 220 sequentially mounted at the front of the bus bar assembly 300.

Specifically, the battery module 200 includes a unit module assembly 190 consisting of two unit modules 150a and 150b. The unit module 150a has a first arrangement A in which a cathode terminal 151 and an anode terminal 152 located at the lower side of the cathode terminal 151 are formed and a second arrangement B in which a cathode terminal 153 and an anode terminal 154 located at the lower side of the cathode terminal 153 are formed. In the same manner, the unit module 150b has a first arrangement A in which a cathode terminal 155 and an anode terminal 156 located at the lower side of the cathode terminal 155 are formed and a second arrangement B in which a cathode terminal 157 and an anode terminal 158 located at the lower side of the cathode terminal 157 are formed. The battery disconnect unit 160 is mounted adjacent to the unit modules 150a and 150b. At the front of the battery disconnect unit 160 are sequentially formed four cathode terminal connection parts 161, 162, 163, and 164 and one anode terminal connection part 165 from above.

The bus bar assembly 300 includes a cover plate 301 mounted at the electrode terminals exposed from the fronts of the unit modules 150a and 150b, the cover plate 301 being formed of an insulative material, and one anode bus bar 350 and four cathode bus bars 360, 361, 362, and 363 mounted on the cover plate 301.

Predetermined portions of the cathode bus bars 360, 361, 362, and 363 and the anode bus bar 350 protrude in a state in which the predetermined portions of the cathode bus bars 360, 361, 362, and 363 and the anode bus bar 350 are bent such that the cathode bus bars 360, 361, 362, and 363 and the anode bus bar 350 contact the cathode terminals 151, 153, 155, and 157 and the anode terminals 152, 154, 156, and 158. Fastening holes 355 are formed at the predetermined portions of the cathode bus bars 360, 361, 362, and 363 and the anode bus bar 350. When fastening protrusions (not shown) formed at the cathode terminals 151, 153, 155, and 157 and the anode terminals 152, 154, 156, and 158 of the unit modules 150a and 150b are inserted through the fastening holes 355, therefore, the bus bar assembly 300 is electrically connected to the battery module 200 at the front of the module case 210.

Terminal covers 370 are hook coupled to the fastening holes 355 and the cathode terminal connection parts to cover connection regions therebetween. An insulation member 360 for securing electrical insulation is further mounted at the top of the anode bus bar 350.

Each of the four cathode bus bars 360, 361, 362, and 363 are formed in the shape of a plate such that the cathode terminals 151, 153, 155, and 157 of the unit modules 150a and 150b are connected to the four cathode terminal connection parts 161, 162, 163, and 164 of the battery disconnect unit 160, respectively. The four cathode bus bars 360, 361, 362, and 363 are mounted on the cover plate 301 such that the four cathode bus bars 360, 361, 362, and 363 extend approximately in the horizontal direction. The anode bus bar 350 is mounted on the cover plate 301 such that the anode terminals 152, 154, 156, and 158 of the unit modules 150a and 150b are connected to the anode terminal connection part 165 formed at the battery disconnect unit 160 while being coupled approximately in a bracket shape through coupling therebetween using bolts 380.

Hereinafter, a coupling structure of the unit module assembly 190 and the bus bar assembly 300 will be described in detail.

First, in the left unit module 150a, the cathode terminal 151 of the first arrangement A is connected to the cathode terminal connection part 161 of the battery disconnect unit 160 via the bus bar 363 and, in the right unit module 150b, the cathode terminal 155 of the first arrangement A is connected to the cathode terminal connection part 162 of the battery disconnect unit 160 via the bus bar 362.

In the same manner, in the left unit module 150a, the cathode terminal 153 of the second arrangement B is connected to the cathode terminal connection part 163 of the battery disconnect unit 160 via the bus bar 361 and, in the right unit module 150b, the cathode terminal 157 of the second arrangement B is connected to the cathode terminal connection part 164 of the battery disconnect unit 160 via the bus bar 360.

In the unit modules 150a and 150b, the anode terminals 152 and 156 of the first arrangement A and the anode terminals 154 and 158 of the second arrangement B are connected to the anode terminal connection part 165 of the battery disconnect unit 160 via the bus bar 350.

Hereinafter, a process of assembling the battery module according to the present invention will be described.

The unit module assembly 190 is mounted in the module case 210, the front of which is exposed, in a state in which the electrode terminals of the unit module assembly 190 are exposed outside. The bus bar assembly 300 is mounted at the open front of the module case 210. In addition, four cathode bus bars 360, 361, 362, and 363 and one anode bus bar 350 for electrical connection between the unit modules 100 are mounted at the bus bar assembly 300.

The bus bar assembly 300 is provided at the left and right sides thereof with four fastening ribs 310, which are coupled to the module case 210. Fastening through holes 211 are formed at regions of the module case 210 corresponding to the fastening ribs 310.

Subsequently, the bus bar assembly cover 400 is mounted at the front of the bus bar assembly 300 to cover the exposed cathode bus bars 360, 361, 362, and 363 and anode bus bar 350. The power cable 162 for supplying power to the battery module 200 is connected through the battery disconnect unit 160.

Finally, the front cover 220 is coupled to the module case 210 while covering the front of the bus bar assembly cover 400. As a result, assembly of the battery module is completed.

FIG. 12 is a bottom perspective view typically showing the bus bar assembly according to the present invention, FIG. 13 is a partially enlarged view typically showing a part C of FIG. 12, and FIGS. 14 and 15 are side views typically showing the bus bar assembly according to the present invention.

Referring to these drawings together with FIGS. 6 to 11, the cover plate 301 of the bus bar assembly 300 is provided with ribs 320 protruding toward the unit module assembly 190. The bus bar assembly 300 is provided at the left and right sides thereof with four fastening ribs 310, which are coupled to the module case 210.

Fastening through holes 311 are formed at the fastening ribs 310. Two positioning protrusions 312 are further formed around each of the fastening through holes 311 in a protruding state. Consequently, when bolts (not shown) are inserted into the fastening through holes 211 of the module case 210 through the fastening through holes 311 of the fastening ribs 310 and the positioning protrusions 312 are inserted into insertion holes 212 formed at the module case 210, the bus bar assembly 300 is stably coupled to the module case 210.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery module comprising:
a unit module assembly comprising unit modules, each of which comprises a plurality of cell assemblies, each of which comprises two or more battery cells, as unit cells, the unit modules being arranged while being adjacent to each other, each of the unit modules having electrode terminals arranged at one side thereof, each of the battery cells being a plate-shaped battery cell, each of the battery cells being configured to have a structure in which an electrode assembly is mounted in a laminate battery case, each of the cell assemblies being configured to have a structure in which a cell cover covers outsides of the two or more battery cells excluding the electrode terminals;
a battery disconnect unit (BDU) arranged at one side of the unit module assembly, the battery disconnect unit having terminal connection parts arranged at the same side as the electrode terminals;
a module case in which the unit modules of the unit module assembly are mounted, the electrode terminals of the unit modules being exposed through the module case, the module case having fastening through holes;
a bus bar assembly comprising a cover plate mounted on the electrode terminals of the unit modules at the module case, the cover plate being formed of an insulative material, the cover plate being provided with two or more fastening ribs, the fastening ribs protruding toward the module case, and fastening through holes being formed at the fastening ribs, and two more bus bars mounted to the cover plate, the bus bars connecting the unit modules to the BDU in parallel; and
fastening members inserted into the fastening through holes of the cover plate and module case to mount the cover plate to the module case.

2. The battery module according to claim 1, wherein each of the unit modules is configured such that the unit cells include a parallel connection and a series connection.

3. The battery module according to claim 1, wherein each of the unit modules has two or more cathode terminals and two or more anode terminals.

4. The battery module according to claim 3, wherein each of the unit modules comprises a first arrangement in which one cathode terminal and one anode terminal are formed and a second arrangement in which one cathode terminal and one anode terminal are formed, the second arrangement being located adjacent to the first arrangement.

5. The battery module according to claim 1, wherein the bus bars comprise:

one anode bus bar for connecting anode terminals of the unit modules to an anode terminal connection part of the BDU; and two or more cathode bus bars for connecting cathode terminals of the unit modules to cathode terminal connection parts of the BDU, respectively.

6. The battery module according to claim 1, wherein the bus bars are coupled to the cover plate in a state in which terminal connection portions of the bus bars protrude.

7. The battery module according to claim 6, wherein fastening holes are formed at the terminal connection portions of the bus bars and the electrode terminals of the unit modules, and fastening members are inserted into the fastening holes for connection.

8. The battery module according to claim 7, wherein the fastening members are bolts.

9. The battery module according to claim 6, wherein fastening holes are formed at the terminal connection portions of the bus bars, and fastening protrusions are formed at the electrode terminals of the unit modules, the fastening protrusions being inserted into the fastening holes.

10. The battery module according to claim 1, wherein the cover plate and the bus bars of the bus bar assembly are integrally formed by insert injection molding.

11. The battery module according to claim 1, wherein the bus bar assembly is configured to have a structure in which the bus bars are coupled to the cover plate by fastening.

12. The battery module according to claim 1, wherein two or more terminal covers for covering the terminals are further mounted at the bus bar assembly.

13. The battery module according to claim 12, wherein the terminal covers are coupled to the bus bar assembly by hook fastening.

14. The battery module according to claim 1, wherein two or more insulation members for securing electrical insulation are further mounted at the bus bar assembly.

15. The battery module according to claim 1, wherein the cover plate is provided with ribs protruding toward the unit modules for preventing interference between the electrode terminals.

16. The battery module according to claim 1, wherein one or more positioning protrusions is formed at each of the fastening ribs, and one or more insertion holes are formed at a corresponding portion of the module case.

17. A battery pack comprising two or more battery modules according to claim 1 mounted in a pack case.

18. A device including a battery module according to claim 1 as a power source.

19. The device according to claim 18, wherein the device is an electric vehicle, a hybrid electric vehicle, a plug-in hybrid electric vehicle, or a power storage device.

20. A device including a battery pack according to claim 18 as a power source.

* * * * *